Jan. 9, 1934. R. J. BRITTAIN, JR 1,943,055
JOURNAL BOX AND CAR FRAME SUPPORT
Original Filed April 29, 1930  2 Sheets-Sheet 1
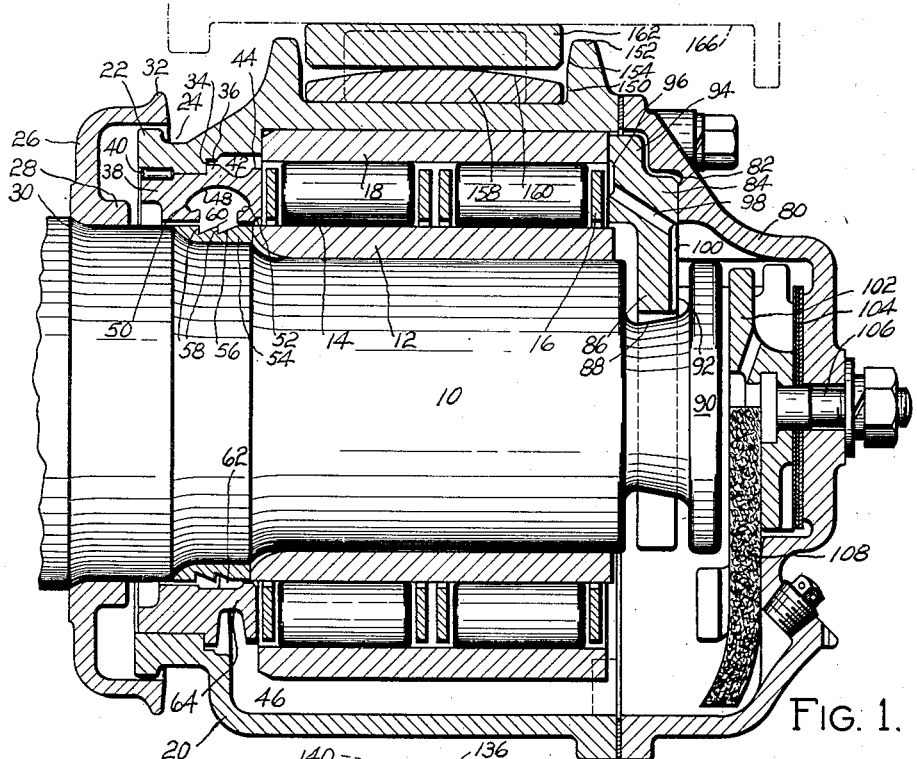
FIG. 1.
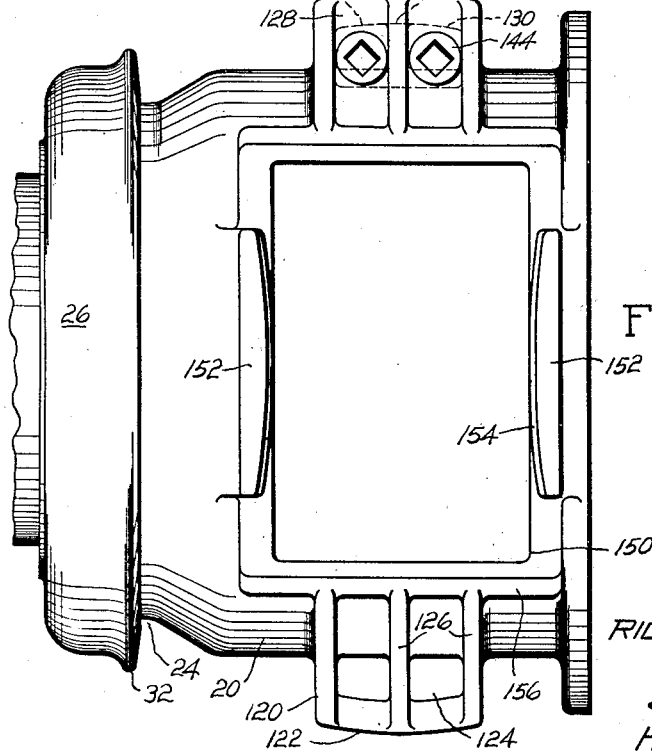
FIG. 2.
INVENTOR:
RICHARD J. BRITTAIN, JR.,
BY
HIS ATTORNEY.

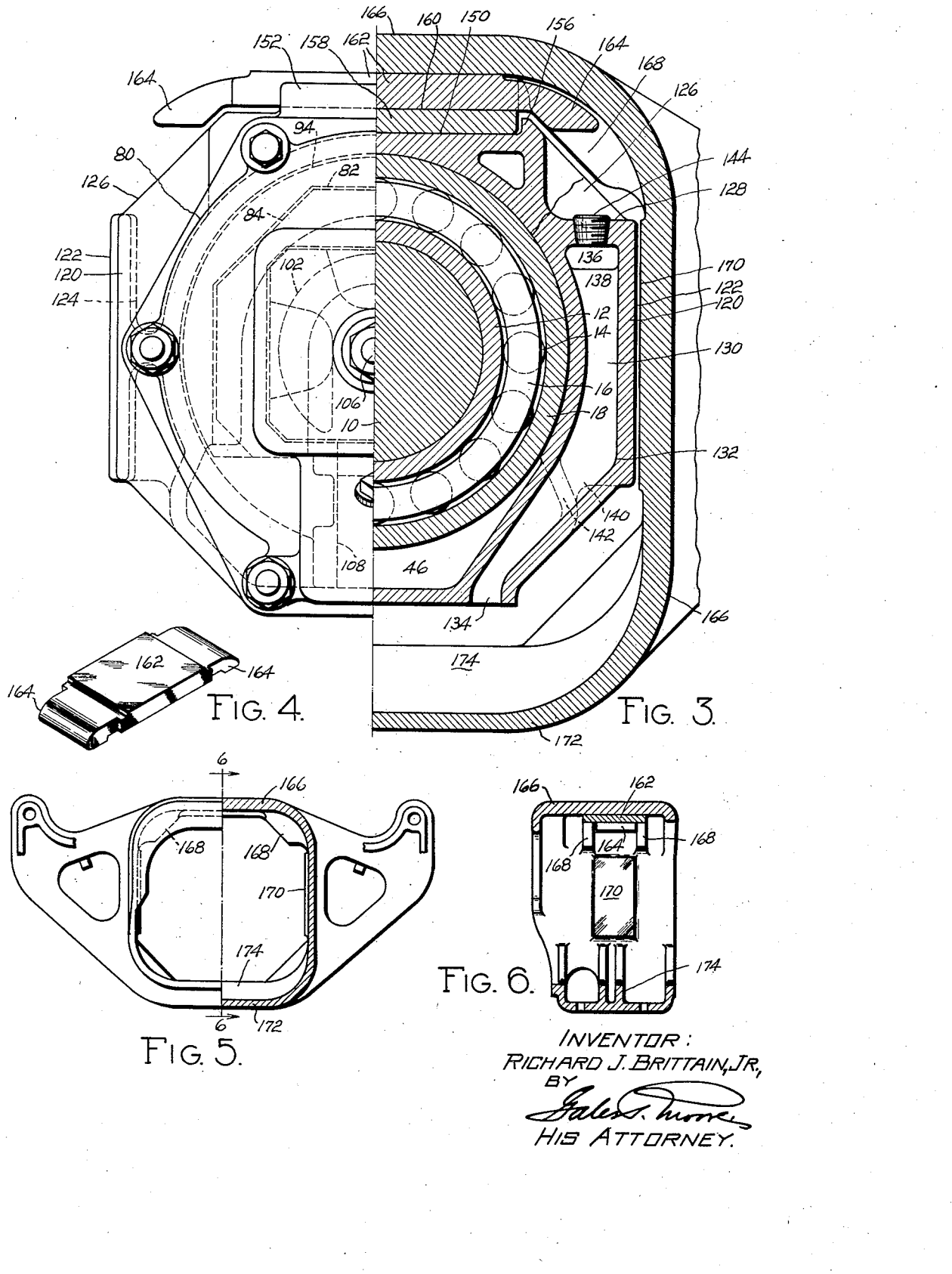

Patented Jan. 9, 1934

1,943,055

UNITED STATES PATENT OFFICE 1,943,055

JOURNAL BOX AND CAR FRAME SUPPORT

Richard J. Brittain, Jr., Bloomfield, N. J., assignor to General Motors Corporation, Detroit, Mich., a corporation of Delaware Original application April 29, 1930, Serial No. 448,240. Divided and this application April 1, 1932. Serial No. 602,417

11 Claims. (Cl. 105—223)

This invention relates to journal boxes and car frame supports and this application is a division of my application Serial Number 448,240, filed April 29, 1930. An object of the invention is to provide an improved device for transmitting load from a frame member to a journal box. Another object is to provide an improved seat plate construction for movably mounting a frame on a journal box. To these ends and also to improve generally upon devices of this character, the invention consists in the various matters hereinafter described and claimed. In its broader aspects the invention is not necessarily limited to the specific construction selected for illustrative purposes in the accompanying drawings in which Fig. 1 is a longitudinal vertical section of an axle box.

Fig. 2 is a plan view of the box.

Fig. 3 is an end view of the box, one half being a cross section of the box and an enclosing frame member.

Fig. 4 is a perspective view of a seat plate.

Fig. 5 is a side view and half section, to small scale, of the frame member.

Fig. 6 is a sectional view on the line 6—6 of Fig. 5, with the upper seat plate in place.

The numeral 10 indicates a shaft or axle carrying a raceway sleeve 12 for roller bearings 14 having cage rings 16. The rollers run in an outer raceway sleeve 18 inserted in the bore of a housing or axle box 20 against a shoulder therein. The rear end of the box has an end flange 22 forming a peripheral drain groove 24. A guard ring 26 has a hub 28 pressed on the axle against a shoulder 30 while an axial flange terminating in a bead or rib 32 encloses the box flange 22 to exclude water and other foreign matter.

The box has an internal shoulder 34 abutting against a locating rib or flange 36 on a sealing ring or bushing 38 which fits a bore at the end of the box and is held from rotation by a dowel pin 40. At one side of the flange 36 is a slanting wall forming an external relief groove 42 bounded laterally by a flange 44. The upper arcuate portion of this groove receives excess lubricant from the bearings and conducts it peripherally to a lubricant reservoir 46 at the bottom of the box. Internally, the bushing has an arcuate inwardly facing groove 48 whose walls are reversely curved to form narrow outwardly facing trap grooves 50 and 52 spaced apart opposite to the middle of a sleeve 54 which is pressed on the axle. The sleeve 54 has a plurality of grooves formed by conical faces 56 meeting flat radial faces 58 thus leaving a slinger rib 60 opposite to the internal groove 48 to sling lubricant into it. Such lubricant will run peripherally in the internal groove and in its trap grooves and will be drained out through the sides of the bushing at side openings 62 therein. Such side openings are at the ends of a bottom wall 64 which prevents lubricant from splashing directly up to the low point of the axle.

The front end of the box is closed by an end cap 80 having internal flat faces 82 engaging corresponding flat faces on a thrust plate 84 to prevent rotation of the latter. The thrust plate is of inverted U-shape with an extension 86 entering a groove 88 of the axle adjacent to a collar 90. The extension has a flat thrust face 92 to engage an opposing thrust face on the collar 90 for limiting endwise movement of the axle in one direction. The thrust plate has an outer portion 94 which is partly in the end cap and partly in the bore of the box, a groove 96 receiving lubricant from the bearings and conducting it through an inclined passage 98 to a groove 100 in the thrust face 92. The axle groove 88 has a conical inner wall so that lubricant, running down to it over the end of the raceway sleeve 12, will work out to the thrust face on the side of the axle collar 90. Outward thrust of the axle is taken on a thrust block 102 clamped against spacing plates 104 in the end cap by a stud 106. A lubricating wick 108 extends from the thrust block to the bottom of the end cap which supplements the lubricant reservoir 46.

The opposite sides of the box have enlargements or extensions 120 the outer faces of which are cylindrically convexed or crowned so that the box can twist around a vertical axis as will appear. One side of the box has recesses 124 between bracing ribs or webs 126. The other side of the box has a flat top wall 128 enclosing the top of a generally vertical passage 130 which widens out at 132 and communicates with the atmosphere at a bottom opening 134. The upper portion of the passage widens out and communicates with a short horizontal opening 136 in the rear wall 138 of the passage 130. The horizontal opening communicates with a second vertical passage 140 back of the partition formed by wall 138, the passage 140 being of a shape similar to passage 130 down as far as a lateral opening 142 communicating with the interior of the box. Threaded plugs 144 in the top wall 128 are to close the chambered box extension after casting operations. The passages form a breather to let air enter the box or leave it freely when the axle shifts endwise therein. This prevents the piston-like action of the axle from sucking in foreign matter or blowing out oil at the axle seal. The wide sections in the passage diminish the velocity of air at such points and so tend to release foreign matter suspended therein.

The box is mounted for universal movement with respect to a car frame structure. The top of the box has a rectangular recess 150 bounded at the ends by cross ribs 152 which are rounded or crowned both vertically and laterally as indicated at 154. The sides of the recess are bounded by ribs 156 to retain a lower seat plate 158. The seat plate has its upper surface 160 cylindrically crowned longitudinally of the axle to form a rocking support for an upper seat plate 162. The crowned faces 154 on the cross ribs 152 allow a relative twisting movement between the box and the seat plate 162 as well as a relative rocking movement longitudinally of the axle. This universal mounting prevents cramping of the axle bearings and consequent overloading. The upper seat plate has narrowed side lugs or extensions 164 which also project downwardly to clear interior corners in a casting or yoke 166 which is supported on the flat upper face of the upper seat plate. The narrowed side extensions project between pairs of inclined ribs 168 at the interior corners of the casting 166 to prevent relative shifting of the seat plate and casting. The interior side walls of the casting have flat faces 170 closely embracing the box but permitting a twisting of the box around a vertical axis by reason of the crowned side faces 122 on the box. The casting has a bottom wall 172 and reinforcing ribs 174 which have clearance with the box bottom to permit of the various motions. The casting is especially designed for mounting on the center axle of a six wheeled truck and for connection to side frames thereof.

I claim:

1. In a device of the character described, a shaft, a journal box having a recess in the top, a lower seat plate in the recess, an upper seat plate in the recess and rockably mounted on the lower seat plate, a frame member resting on the upper seat plate, the frame member having spaced ribs holding the upper seat plate from shifting relatively thereto; substantially as described.

2. In a device of the character described, a shaft, a journal box having a recess in the top, a lower seat plate in the recess, an upper seat plate in the recess and rockably mounted on the lower seat plate, a frame member resting on the upper seat plate, and the top of the box having cross walls confining the ends of the seat plates, and said walls and upper seat plate having adjacent edges which are relatively crowned in a vertical direction to allow said upper seat plate to rock on the lower one; substantially as described.

3. In a device of the character described, a shaft, a journal box having a recess in the top, a lower seat plate in the recess, an upper seat plate in the recess and rockably mounted on the lower seat plate, a frame member resting on the upper seat plate, and the top of the box having cross walls defining the ends of the recess, said cross walls being crowned both laterally and vertically to allow rocking and twisting of the upper seat plate with the frame member; substantially as described.

4. In a device of the character described, a journal box having a recess in the top, a lower seat plate in the recess, an upper seat plate in the recess and rockably mounted on the lower seat plate, a frame member resting on the upper seat plate and having spaced ribs at the sides of the recess, and the upper seat plate having side extensions projecting from the recess into the space between said ribs of the frame member; substantially as described.

5. In a device of the character described, a journal box having a recess in the top, a lower seat plate in the recess, an upper seat plate in the recess and rockably mounted on the lower seat plate, a frame member resting on the upper seat plate and having spaced ribs at the sides of the recess, the upper seat plate having side extensions projecting from the recess into the space between said ribs of the frame member, and the box having cross walls defining the ends of the recess and presenting crowned surfaces to the ends of the upper seat plate; substantially as described.

6. In a device of the character described, a journal box having a recess in the top, a lower seat plate in the recess, an upper seat plate in the recess and rockably mounted on the lower seat plate, a frame member resting on the upper seat plate and having spaced ribs at the sides of the recess, the upper seat plate having side extensions projecting from the recess into the space between said ribs of the frame member, and the box having cross walls defining the ends of the recess, said cross walls and the adjacent edges of the upper seat plate being relatively crowned both horizontally and vertically to allow the upper seat plate to twist around a vertical axis and rock longitudinally of the box with the frame member; substantially as described.

7. In a device of the character described, a journal box, a yoke embracing the box, the yoke having internally projecting ribs, a seat plate extending across the box and supporting the yoke, the seat plate having side extensions projecting between said ribs, and means for rockably supporting the seat plate on the box; substantially as described.

8. In a device of the character described, a journal box, a yoke embracing the box, a seat plate extending across the box and engaging the yoke, the sides of the seat plate and the yoke having interfitting projections to prevent relative shifting, and means for rockably supporting the seat plate on the box; substantially as described.

9. In a device of the character described, a journal box having cross walls on the top, a seat plate extending across the box between said cross walls, a frame member resting on the seat plate, opposite sides of the seat plate and the frame member having interfitting projections to prevent relative shifting, and means for rockably supporting the seat plate on the box; substantially as described.

10. In a device of the character described, a journal box having cross walls on the top, a seat plate extending across the box between said cross walls, a frame member resting on the said plate, the frame member having spaced ribs at opposite sides of the box, the seat plate having side extensions projecting between said ribs, and means for rockably supporting the seat plate on the box; substantially as described.

11. In a device of the character described, a journal box having cross walls on the top, a seat plate extending across the box between said cross walls, a yoke embracing the sides of the box and supported by said seat plate, means for holding the seat plate from shifting with respect to the yoke, the ends of the seat plate and the cross walls having a relative crowning crosswise of the box to permit a relative twisting around a vertical axis of the box and yoke, and the sides of the box having crowned surfaces embraced by the adjacent sides of the yoke; substantially as described.

RICHARD J. BRITTAIN, Jr.